March 23, 1965  J. P. FRANCIS  3,174,195
ADJUSTABLE AUTOMOBILE WINDSHIELD AWNING
Filed July 22, 1963
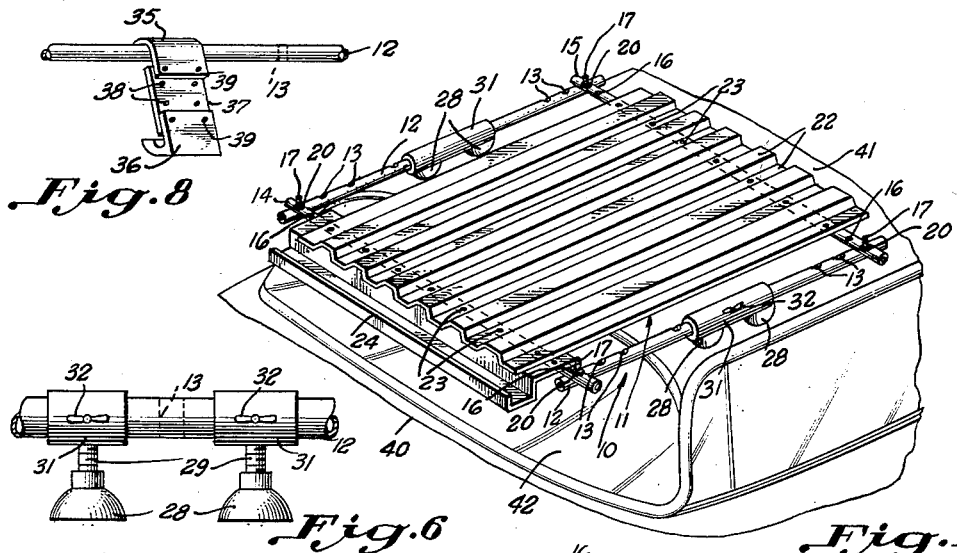
Fig. 8
Fig. 6
Fig. 1
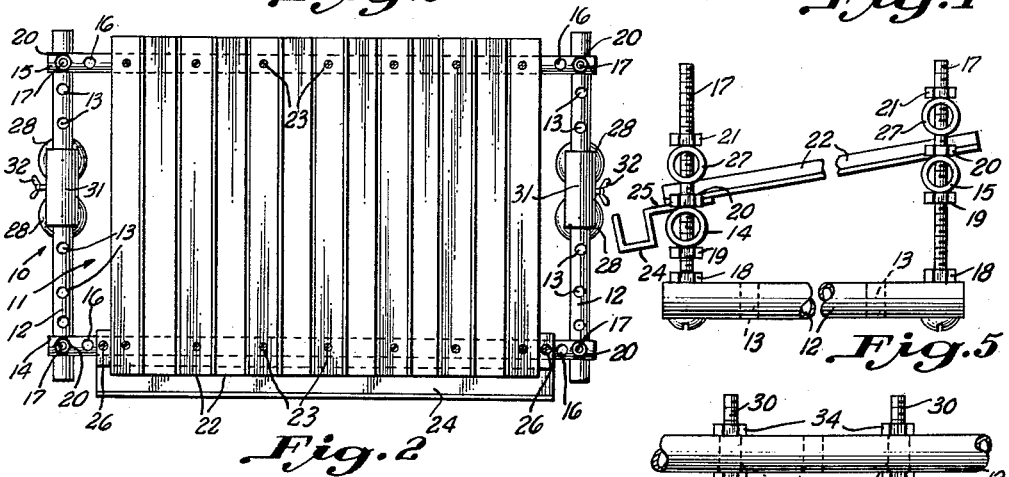
Fig. 2
Fig. 5
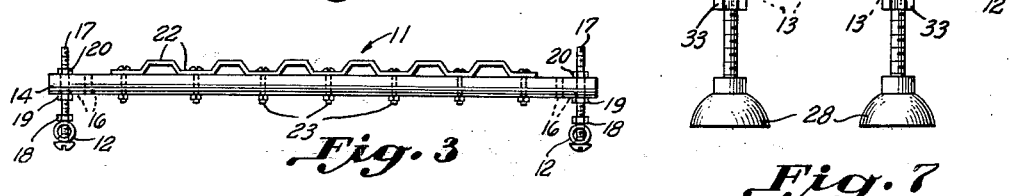
Fig. 3
Fig. 7
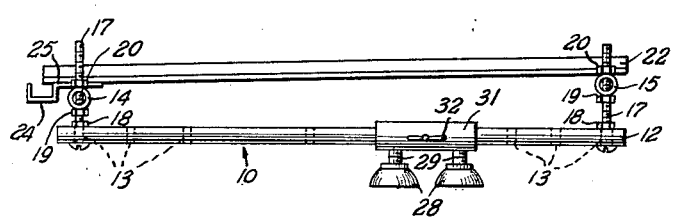
Fig. 4
INVENTOR
John P. Francis

United States Patent Office 3,174,195
Patented Mar. 23, 1965

3,174,195
ADJUSTABLE AUTOMOBILE WINDSHIELD
AWNING
John P. Francis, 20 Boston St., Haverhill, Mass.
Filed July 22, 1963, Ser. No. 296,793
2 Claims. (Cl. 20—57.5)

This invention relates to improvements in automobile windshield awnings and the supporting means for supporting the said awning, an object thereof being to provide a simple, and an improved awning structure adapted to be adjustable vertically and longitudinally angular relative to the roof top and the windshield area of the vehicle.

Another object thereof is to provide a permanent, semipermanent, or a temporary and removable knockdown supporting structure for supporting a removable awning structure for partial or full retraction when not adjustably extended for use over the windshield area, or easily and quickly removed in whole or in part from the roof top, and disassembled in a like manner for stowage within the vehicle or elsewhere.

A still further and important object thereof is to provide protection to the windshield area and a portion of the roof top from the sun, rain, sleet, snow, or the formation of ice thereon, and to provide clean and clear visibility for proper vision at all times when veiwing outdoor movies at drive-in theatres and other outdoor events, thus eliminating the continuous or the on and off use of the windshield wipers.

With these objects and still others in view, as will hereinafter more fully appear, the invention comprises certain novel constructions, combinations, and arrangement of parts, hereinafter described and claimed and illustrated in the accompanying drawings, in which:

FIGURE 1 is a perspective view, in fragment, of the front portion of an automobile, the view including a perspective view of the awning and the supporting structure shown supported over the roof top and the windshield area.

FIGURE 2 is a top plan view of the awning structure, shown attached to the forward and the rear laterally disposed frame members of the adjustable frame structure.

FIGURE 3 is a front end elevation view of the corrugated-shaped awning panel, minus the laterally disposed rain gutter, shown removably attached to the forward laterally disposed frame member of the frame structure.

FIGURE 4 is a side elevation view of the awning structure shown adjustably supported above the side longitudinal frame members of the frame structure.

FIGURE 5 is a side elevation, fragmentary view, of the awning and frame structures shown with the added awning securing members located at the top thereof.

FIGURE 6 is a side elevation view, of a modified form of roof engaging means for supporting the frame structure.

FIGURE 7 is a side elevation view, of another modified form of roof engaging means for supporting the frame structure; and FIGURE 8 is a side elevation view of the frame clamping members adapted to adjustably secure the frame structure to the roof top of an automobile.

Referring now more specifically to the drawings, attention is directed to FIGURES 1, 2 and 4, wherein numeral 10 generally indicates the frame structure, and numeral 11 generally indicates the awning structure.

A frame and awning structure and a variation of roof engaging means are shown and described in my copending application, Serial No. 89,608, filed February 14, 1961, now Patent No. 3,131,755. My invention therefore, is concerned primarily with a modified form of a frame and awning structure.

In FIGURE 1, a portion of an automobile 40 is shown, the awning structure 11 being adjustably supported on the frame structure 10 supported above the roof top 41 and over the windshield area 42. The said awning structure 11 is adapted to be movably supported in either adjustable vertically spaced apart relationship, or in longitudinally angular adjustment, independently of and above the position of the side longitudinally disposed frome members 12 of the frame structure 10.

In supporting the frame structure 10, roof engaging means in the form of vacuum cups 28, are removably or permanently attached to the roof top 41 at the desired location laterally and longitudinally, as shown. Adjustably attached to each vacuum cup 28 is a vertically disposed threaded stud member 29 attached to the longitudinal tubular frame supporting member 31, as shown in FIGURE 4, and shown in a modified form as two separate supporting members 31 in FIGURE 6.

In FIGURE 7, there is shown an other modified form of roof engaging means comprising the vertical threaded stud members 30 adjustably attached to the vacuum cups 28. Each vertically disposed threaded stud member 30 extends through a pre-selected vertical aperture 13 formed in the side longitudinal frame members 12. A lower threaded nut member 33, and an upper threaded nut member 34, provides individual supporting engagement of each stud member 30 to each side frame member 12, thus providing vertical and angular adjustment in addition to any longitudinally movable adjustment of the frame structure 10.

In FIGURE 8, another form of the frame structure 10 securing means is shown. The vertically spaced apart clamping members 35 and 36 may be used with the various modifications of the roof engaging means shown, or the said clamping members may be used to secure the frame structure 10 in direct roof friction supporting engagement. Upper clamping member 35, which is freely engaged to the side longitudinal frame member 12, has a flexible band 37 adjustably attached by threaded bolt members 39. The band 37 is provided with a number of spaced apart apertures 38, with the lower end of the said band 37 adjustably engaging the rain gutter hook member 36 by the lower bolt members 39. The lower hook member 36 is adapted to engage the rain gutter, thus providing adjustable vertical clamping engagement of the frame structure 10 downwardly on the roof top 41.

The side longitudinal tubular frame supporting members 31, as shown in FIGURES 1, 2, 4 and 6, provides vertical and longitudinally angular supporting adjustment of the frame structure 10 upon vertical adjustment of the selected threaded stud members 29 within the axially adjustable vacuum cups 28. Thumb screws 32, on said frame supporting members 31, adjustably secures the movement of the longitudinally movable side frame members 12 of the frame structure 10.

Referring back to FIGURE 2, there is shown the adjustable frame structure 10, comprising, mainly, the two side longitudinally disposed tubular frame members 12. Each of said side frame members 12 is provided with a number of longitudinally spaced apart vertical apertures 13. Adjustably and removably attached, to each side frame member 12, is the forward lateral frame member 14 and the rear lateral frame member 15, each having spaced apart vertical apertures 16 to receive the frame securing bolt members 17 therethrough. The vertical apertures 13 and 16 are preferably enlarged apertures, or, the apertures 13 may be threaded to receive the threaded bolt members 17 thereto. Threaded bolt member 17 is provided with a bolt securing nut member 18 thereon which engages the upper surface of the side frame member 12, to secure the said bolt member 17 thereto, shown in FIGURES 3, 4 and 5.

The awning structure 11, FIGURES 1, 2, 3, 4 and 5, is a rigid awning panel 22 preferably corrugated-shaped, as more clearly shown in FIGURE 3, although a flat or other structural shaped awning panel may be used. The awning panel 22 may be one, or more than one longitudinal section, overlapping each section laterally, thus reducing the lateral size of the awning panel 22 in stowing each sectional panel upon the other sectional panel on the frame structure 10, or for a partial or complete removal and re-installation of the awning panel 22 on the said frame structure 10.

In FIGURES 1, 2 and 3 are shown the awning engaging bolt members 23, or other suitable means, adapted to engage the awning panel 22 for temporary, semi-permanent or permanent attachment to the forward 14 and rear 15 lateral frame members of the frame structure 10.

Also forming a part of the awning structure 11, is the removably attached laterally disposed substantially U-shaped awning rain gutter 24 having a lip or flange portion 25, as shown in FIGURES 2, 4 and 5, engaged and supported beneath the forward lateral end of the awning panel 22 and the upper surface of the forward lateral frame member 14, and secured by threaded end members 26 as shown in FIGURE 2.

In FIGURE 5, there is shown a side elevation fragmentary view of the awning panel 22 and the side frame member 12. Removably attached to the vertical threaded bolt member 17, is an additional laterally disposed awning securing member 27, adjustably secured downwardly onto the awning panel 22 by the additional threaded nut securing member 21 on bolt member 17, as shown. The said awning panel securing members 17 and 21, are used as additional securing members, or as a securing means to provide for a fast and safe temporary installation and removal of said awning panel 22 to the frame structure 10, such as in a drive-in theatre due to inclement weather conditions.

In FIGURES 4 and 5, there is shown more clearly the vertical and the longitudinally angular adjustable alignment of the awning panel 22, relative to the lower portion or side frame members 12 of the frame structure 10. The desired adjustment of the said awning panel 22 is provided by the threaded nut supporting member 19, on each bolt member 17, to adjustably engage and support, independent of each other, the underside of each lateral frame member 14 and 15. The upper nut securing member 20, on each bolt member 17, engages the upper surface of the lateral frame members 14 and 15 to secure the said lateral frame members downwardly on said supporting nut members 19.

The rigid corrugated-shaped awning panel 22 of the awning strutcure 11, as clearly shown in FIGURES 1, 2, and 3, is adjustably supported independently of and above the side frame members 12 as shown in FIGURES 4 and 5, regardless of the longitudinal or the longitudinally angular supporting position of the said side frame members 12 relative to the roof top 41. The awning panel 22 is adapted therefore to be provided with a large protective surface area, both laterally and longitudinally, thereby providing increased weather protection to both the windshield area and a substantial portion of the roof top. In addition, the independent longitudinal angularity of the awning panel 22 is adapted to be very much greater than the angle, if any, of the side frame members 12 without any windshield vision interference or any reduction of vision therethrough.

The laterally disposed awning rain gutter 24 will shed the water accumulation from the rain awning panel 22 at either, or both ends of the said rain gutter 24, depending upon the horizontal position of the said laterally disposed rain gutter 24.

It is quite obvious therefore, that the rigid awning panel 22 with its various and large range of adjustments provides a frame 10 and awning structure 11 which eliminates any accumulation of ice, snow, sleet or rain thereon, in comparison to flexible or fabric awning panels, and awnings limited in adjustments.

The extreme simplicity in the structural and the functional features of the device; the exceptional advantages in the erection, adjustments, stowage, or removal in whole or in part; and combined with the viewing pleasures and benefits derived therefrom; these objects, all enjoyed and benefited by both the management and the patrons during inclement weather conditions, while viewing outdoor movies or other outdoor events.

While certain embodiments of my invention have been disclosed in the foregoing description, it will be understood that various modifications may occur to those skilled in the art. Changes, therefore, in the construction and arrangement, may be made without departing from the spirit and the scope of the invention as disclosed in the appended claims.

I claim:

1. An adjustable rain awning structure adjustably supported above the roof top and the windshield area of an automobile comprising, a frame structure having longitudinally extending laterally spaced apart frame members each provided with longitudinally spaced apart vertical apertures, forward and rear laterally directed and longitudinally spaced frame members each provided with laterally spaced apart vertical apertures, means adjustably connecting and supporting said laterally directed frame members in adjustable vertically spaced relation above the said longitudinally extending frame members comprising longitudinally spaced apart threaded bolt members, said bolt members extending upwardly and freely through the vertical apertures in said frame members, a threaded bolt securing member on said bolt members engaging said longitudinal frame members for removably supporting said bolt members thereto, an axially rotatable and vertically movable threaded frame supporting member positioned on each of the said threaded frame securing bolt members between the said upper and lower vertically spaced apart frame members, each of the said threaded frame supporting members adapted to freely engage and to adjustably support the underside of the said laterally directed frame members for the individual and independent vertical supporting adjustment of each end of the said laterally directed frame members on each of the said bolt members, a removably attached rigid awning panel movably supported by each laterally directed frame member, said awning panel adapted to be adjustably supported in vertically spaced apart relationship or in laterally or longitudinally angular adjustment, said vertical awning adjustment being from and above the said longitudinally extending side frame members upon the said vertically movable adjustment of the said threaded frame supporting members on said bolt members in raising or lowering either one or both of the said longitudinally spaced laterally directed frame members, and means for supporting the said frame structure to the roof top.

2. An adjustable rain awning structure adjustably supported above the roof top and the windshield area of an automobile comprising, a frame structure having longitudinally extending laterally spaced apart frame members each provided with longitudinally spaced apart vertical apertures, forward and rear laterally directed and longitudinally spaced frame members each provided with laterally spaced apart vertical apertures, means adjustably connecting and supporting said laterally directed frame members in adjustable vertically spaced relation above the said longitudinally extending frame members comprising longitudinally spaced apart threaded bolt members, said bolt members extending upwardly and freely through the vertical apertures in said frame members, a threaded bolt securing member on said bolt members engaging said longitudinal frame members for removably supporting said bolt members thereto, an axially rotatable and vertically movable threaded frame supporting member positioned on each of the said threaded frame securing bolt members between the said upper and lower vertically spaced apart frame members, each of the said threaded frame supporting members adapted to freely engage and to adjustably support the underside of the said laterally directed frame members for the individual and independent vertical supporting adjustment of each end of the said laterally directed frame members on each of the said bolt members, a removably attached rigid awning panel movably supported by each laterally directed frame member, said awning panel adapted to be adjustably supported in vertically spaced apart relationship or in laterally or longitudinally angular adjustment, said vertical awning adjustment being from and above the said longitudinally extending side frame members upon the said vertically movable adjustment of the said threaded frame supporting members on said bolt members in raising or lowering either one or both of the said longitudinally spaced laterally directed frame members, a laterally positioned and vertically movable awning panel securing member adjustably mounted on said laterally spaced frame securing bolt members, said lateral awning panel securing member adapted to frictionally and freely engage the upper surface of the awning panel and to adjustably secure the said removably attached awning panel in the selected vertical and longitudinal position between the said upper lateral awning panel securing member and the lower laterally directed frame member of the frame structure, vertically adjustable threaded awning clamping members on said bolt members clampingly engaging the upper surface of the said laterally positioned awning panel securing member to adjustably and clampingly secure the said awning panel downwardly on the said laterally directed frame member of the frame structure, and means for supporting the said frame structure to the roof top.

References Cited by the Examiner
UNITED STATES PATENTS

| | | | |
|---|---|---|---|
| 2,710,995 | 6/55 | Stelzer | 20—57.5 |
| 2,989,339 | 6/61 | Southall | 160—368 |
| 3,097,014 | 7/63 | Francis | 160—368 |

HARRISON R. MOSELEY, *Primary Examiner.*